(12) United States Patent
Basche et al.

(10) Patent No.: US 8,417,036 B2
(45) Date of Patent: Apr. 9, 2013

(54) METHOD FOR SELECTING A DESIGNATION

(75) Inventors: Boris Basche, Bernhardswald (DE); Nhu Nguyen Thien, Regensburg (DE)

(73) Assignee: Siemens VDO Automotive AG, Regensburg (DE)

( * ) Notice: Subject to any disclaimer, the term of this patent is extended or adjusted under 35 U.S.C. 154(b) by 0 days.

(21) Appl. No.: 11/988,400

(22) PCT Filed: May 15, 2006

(86) PCT No.: PCT/EP2006/062304
§ 371 (c)(1), (2), (4) Date: Feb. 15, 2008

(87) PCT Pub. No.: WO2007/003464
PCT Pub. Date: Jan. 11, 2007

(65) Prior Publication Data
US 2009/0125224 A1    May 14, 2009

(30) Foreign Application Priority Data
Jul. 6, 2005 (DE) .......... 10 2005 031 656

(51) Int. Cl.
*G06K 9/00* (2006.01)

(52) U.S. Cl. .......... 382/187; 382/181

(58) Field of Classification Search .......... 382/181–231, 382/305, 306
See application file for complete search history.

(56) References Cited

U.S. PATENT DOCUMENTS

| | | | |
|---|---|---|---|
| 3,259,883 A | 7/1966 | Rabinow et al. | |
| 5,379,127 A * | 1/1995 | Ando | 358/448 |
| 5,724,449 A * | 3/1998 | Cornerford | 382/230 |
| 5,724,457 A * | 3/1998 | Fukushima | 382/311 |
| 5,754,430 A | 5/1998 | Sawada | |
| 5,835,635 A | 11/1998 | Nozaki et al. | |
| 5,881,169 A | 3/1999 | Henry, Jr. | |
| 6,148,104 A | 11/2000 | Wang et al. | |
| 2003/0016873 A1 | 1/2003 | Nagel et al. | |

FOREIGN PATENT DOCUMENTS

| | | |
|---|---|---|
| EP | 0 675 341 | 10/1995 |
| EP | 0 841 630 | 5/1998 |
| WO | WO 98/11480 | 3/1998 |

* cited by examiner

*Primary Examiner* — Alex Liew
(74) *Attorney, Agent, or Firm* — Cozen O'Connor

(57) ABSTRACT

Presented is a method for selecting a label from a multiplicity of labels stored in a memory element. The method includes inputting a handwritten character into a handwritten input apparatus, associating an alphanumeric character with the handwritten input character using a character recognition apparatus, adding the associated alphanumeric character to an already input character string to produce an extended character string, comparing the extended character string with the labels stored in the memory element, and selecting one or more of the stored labels using the comparison. The alphanumeric character is selected from a dynamically alterable character set which contains only characters which, in addition to the already input character string, produce an extended character string, which is an initial component of at least one of the stored labels. Also presented is a motor vehicle navigation system in which address database entries are selected by the above described method.

10 Claims, 3 Drawing Sheets

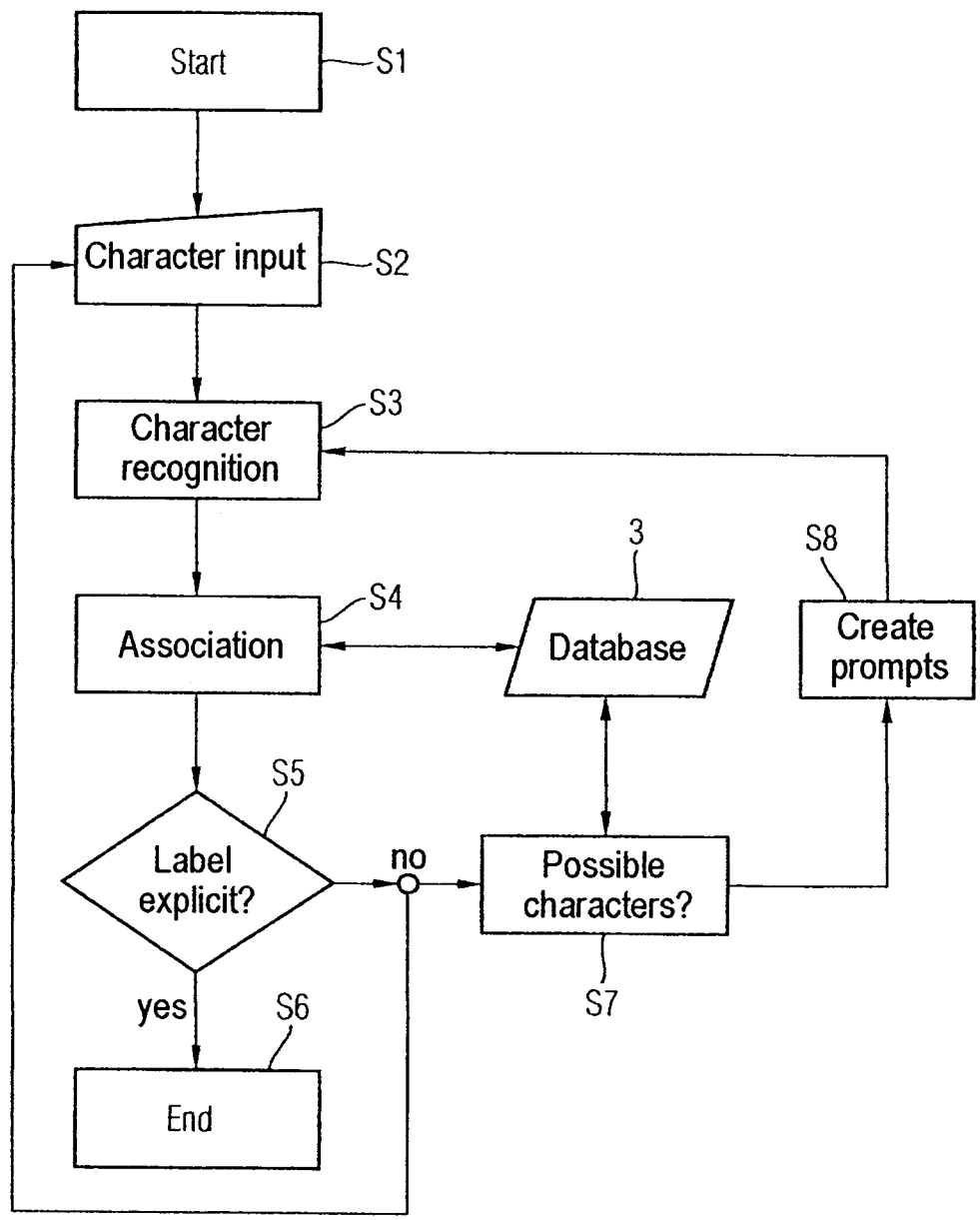

| Step | Already input characters | Handwritten input | Available characters | Associated alphanum. character | Available labels (list) | Available characters (new) |
|---|---|---|---|---|---|---|
| 0 | | | a-z, 0-9, special characters | | A-Dorf ... B-Dorf .... Waldheim Weilheim Weitstadt Wetzstadt Wirstadt W-Dorf ... | a-z, 0-9, special characters |
| 1 | | W | a-z, 0-9, special characters | W | Waldheim Weilheim Weitstadt Wetzstadt Wirstadt W-Dorf | a, e, i, - |
| 2 | W | e | a, e, i, - | e | Weilheim Weitstadt Wetzstadt | i, t |
| 3 | We | l | i, t | i | Weilheim Weitstadt | l, t |
| 4 | Wei | l | l, t | l | Weilheim | |

FIG. 1B

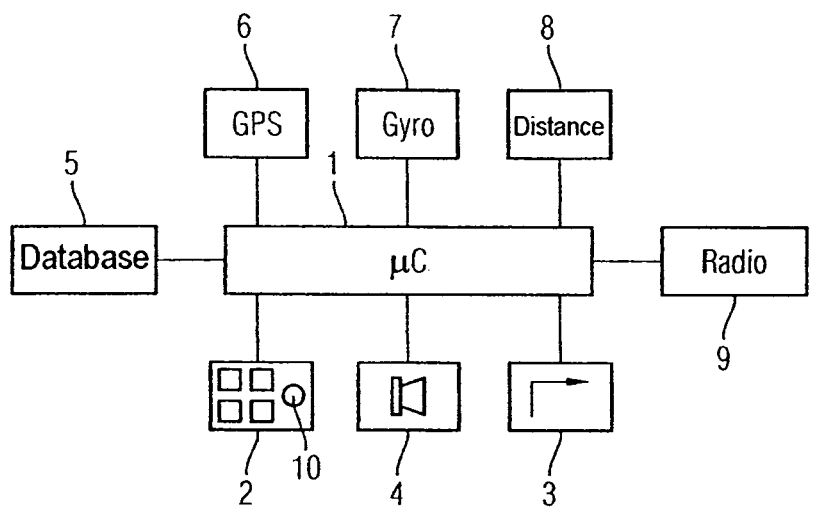
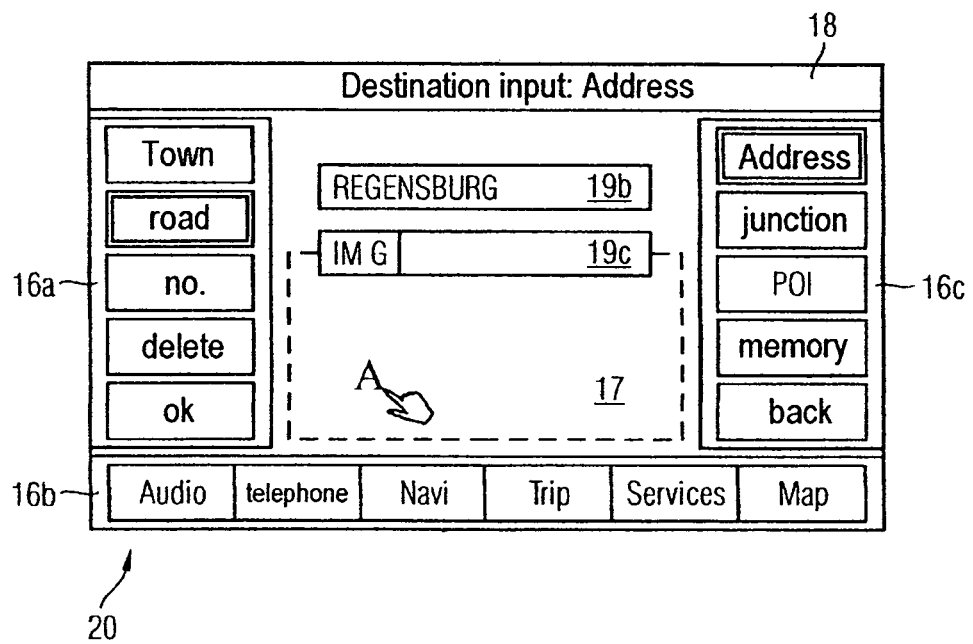

METHOD FOR SELECTING A DESIGNATION

CROSS REFERENCE TO RELATED APPLICATIONS

This is a U.S. national stage of application No. PCT/EP2006/062304, filed on 15 May 2006. Priority is claimed on German Application No. 10 2005 031 656.5, filed on 6 Jul. 2005.

BACKGROUND OF THE INVENTION

1. Field of the Invention

The invention relates to a method for selecting a label from a multiplicity of labels stored in a memory element by handwritten input of a character into a handwritten input apparatus, association of an alphanumeric character with the handwritten input character in a character recognition apparatus, addition of the associated alphanumeric character to an already input character string to produce an extended character string, comparison of the extended character string with the labels stored in the memory element, and selection of one or more of the stored labels using the comparison. The invention also relates to a motor vehicle navigation system.

2. Description of Prior Art

In motor vehicle navigation systems and other appliances, such as travel ticket machines, it is necessary to select a label, such as a place name, from a large number of stored labels. In principle, a label of this kind can be input using a keypad. Often, a keypad of this kind is not provided for reasons of space, however. A touch-sensitive input system, such as a touchpad or a touchscreen, can be used to input characters in handwriting. A handwriting recognition system is used to recognize the input characters, that is to say that an alphanumeric character is associated with the input character. In this context, a distinction is drawn between handwriting recognition systems in which the characters need to be input on the basis of fixed rules and those which allow free input, that is to say with the writer's individual writing style. Users prefer the latter handwriting recognition systems, since there is no need for a prior learning process to learn the input rules for the characters. However, these systems then have the problem of an input character being ambiguous. By way of example, a vertical stroke can be interpreted either as the digit "1" or as the letter "L" (in lower case) or as the letter "I". A circle can accordingly be interpreted as the letter "O" or as the digit "0". Similar problems may also arise when inputting a character for the letters "a", "d" and "q" and others, for example.

To solve this problem of an input character being ambiguous, the alphanumeric characters which are possible for the input character can be presented to the user for manual selection. The user then needs to decide manually, for example, whether the vertical stroke which he has input is to be interpreted as a "1" or as an "L" or an "I".

In addition, it is possible to infer the appropriate alphanumeric character to some extent from the context of the character input. If a telephone number is being input, for example, then the input of a circle can mean only the digit "0" and not the letter "O", for example. In addition, it is also possible to preselect, for example manually, that only letters or only numbers are input.

If a handwriting recognition system is used to input destinations in a navigation system, the ambiguity described above can be resolved using neither the context nor a limitation to the input of exclusively letters or numbers, since numbers and letters are permitted equally. Also, manual selection between a plurality of alphanumeric characters which are possible for the input character is inexpedient, particularly in the case of motor vehicle navigation systems, since it increases the complexity of operator control and detains users who are intent on rapid input of the destination.

SUMMARY OF THE INVENTION

It is therefore an object of the invention to develop a method of the generic type for selecting a label such that the occurrence of ambiguities is at least reduced. It is a further object of the invention to specify a motor vehicle navigation system with handwritten input.

The first object is achieved in a method of the generic type by virtue of the alphanumeric character to be associated being selected from a dynamically alterable character set which contains only those characters which, in addition to the already input character string, produce an extended character string which is the initial component of at least one of the stored labels.

In the case of the inventive method, the alphanumeric characters which can be associated with an input character are therefore limited. In this case, the limitation is made as described below. The already input character string is compared with the stored labels. In this context, those stored labels whose initial component matches the already input character string are selected. Next, the stored labels selected in this manner are examined to determine which alphanumeric character follows the input character string in the labels selected in this manner. Only the characters located in this case are then considered as possible alphanumeric characters for the association with the next handwritten input character. The reduced number of alphanumeric characters means that in many cases it is already possible to eliminate ambiguities. If, by way of example, the already input character string is used to establish that the next alphanumeric character in a label can now only be the letters E, L and N, input of a vertical stroke by the user will mean that now only the letter "L" is possible as the next character, and no longer the letter "I" or the digit "1".

In particular, the dynamically alterable character set may be stored in the form of a list. Using such a list, it is possible to associate an alphanumeric character with the handwritten input character particularly quickly. In addition, the list can be adapted easily and quickly.

Right at the start of input of a label, i.e. when only one or a few characters have been input, the large number of labels which are still possible mean that it is not always possible to avoid ambiguities occurring. If it is not explicitly possible to associate an alphanumeric character with the handwritten input character, two or more alphanumeric characters may therefore be presented to the user for selection.

In addition, following the comparison of the extended character string with the labels stored in the memory element, it is possible to create a list with those labels which contain the extended character set as initial component R. This refinement has the advantage that when a further character has been input and an alphanumeric character has been associated with this handwritten input character, it is no longer necessary to compare the character string which is then present with all the stored labels in the database. Rather, it is sufficient to perform the comparison only with the labels in the created list, since only the labels shown there have the already input character string as a component. The relatively small number of comparisons to be performed means that the processing speed can therefore be increased.

When the alphanumeric character has been associated with the handwritten input character, i.e. when the input character has been recognized, it is also possible to output an acknowledgement to the user. This acknowledgement can be provided in visual, audible or haptic form. An audible acknowledgement has the advantage that the user is not distracted from what is happening in the traffic, for example, as may be the case with a visual acknowledgement. Particular preference is given to a haptic acknowledgement, for example where the handwritten input apparatus vibrates briefly. The user, whose finger still rests on the handwritten input apparatus following the handwritten input, is therefore provided with an acknowledgement without other passengers being disturbed by the manner of the acknowledgement.

The inventive method can be carried out particularly for the purpose of selecting database entries in a motor vehicle navigation system.

The motor vehicle navigation system may have a touchpad, which is particularly integrated in a rotary/push control, as handwritten input apparatus. This results in a compact operator control unit for a navigation system which takes up only little space in the motor vehicle, and secondly allows unrestricted input of characters.

The handwritten input apparatus may also be in the form of a touchscreen in the motor vehicle navigation system. This also results in a compact design, since a display device and an operator control unit can be implemented within the touchscreen.

BRIEF DESCRIPTION OF THE DRAWINGS

The invention is explained in more detail below with reference to an exemplary embodiment and the drawings.

FIG. 1A is an illustrative flowchart of a method for selecting a label from a multiplicity of labels stored in a memory element.

FIG. 1B is an illustrative table showing steps for selecting a fictional place name using the method of FIG. 1A.

FIG. 2 is an illustrative block diagram of the components of a motor vehicle navigation system.

FIG. 3 is an illustrative diagram of a touchscreen configured as a combined operator control/output unit in a motor vehicle navigation system.

DETAILED DESCRIPTION OF THE PREFERRED EMBODIMENTS

FIG. 1A is an illustrative flowchart of a method for selecting a label from a multiplicity of labels stored in a memory element. The method starts in step S1 with initialization of the system. In step S2, the handwritten input of a character into a handwritten input apparatus then takes place. In step S3, a computer program for handwriting recognition is used to associate an alphanumeric character with the input character. In this case, an alphanumeric character is associated using a dynamically alterable character set. The dynamically alterable character set contains only those characters which, in addition to an already indicated character string, produce a new extended character string which is the initial component of at least one of the stored labels. In step S4, the recognized alphanumeric character is first of all added to an already existing character string, and the new character string obtained in this way is compared with the entries in a database 3. In this context, labels which have the already input character string as initial component are selected. In step S5, a check is performed to determine whether the input character string already allows explicit recognition of a label. If this is the case, the list entry sought is found and the method is terminated in step S6.

If there are still a plurality of labels in step S5, which means that it is not yet possible to explicitly associate a label with the input character string, step S7 involves using the labels which contain the character string to check what alphanumeric characters are possible as the next input character. The possible further characters for the next input step which are ascertained in this manner are provided in step S8 as prompts for the character recognition apparatus and are made available to the character recognition in step S3.

In parallel with this, following step S5, a further character input is permitted, which means that the next character can be input in step S2. The character which is now input afresh is used in step S3 to perform character recognition again, with the characters provided in step S8 now being selectable. Hence, when each character has been input, steps S7 and S8 provide a new list of possible characters which matches the selectable labels.

FIG. 1B is an illustrative table showing steps for selecting a fictional place name using the method described above. At the start of the method (step 0), no characters have been input yet. Hence, all the letters from A to Z and all the digits from 0 to 9 and also special characters are available. No distinction is drawn between upper case and lower case, i.e. letters can be input both in upper case and in lower case.

At the start, the list of available labels still contains all the labels in the database.

In step 1, the first character is now input in handwriting. For the association of an alphanumeric character, all characters are still available, as indicated previously. The handwritten input has had the alphanumeric character "W" associated with it. The labels which therefore continue to be possible are therefore reduced to those labels which begin with the letter "W", that is to say in the example given "Waldheim", "Weilheim", "Weitstadt", "Wetzstadt", "Wirstadt" and "W-Dorf". The second alphanumeric character possible is therefore now only "a", "e", "i" and "-".

In step 2, the character "W" has already been input. The new handwritten input of the character "e" is compared with the available characters "a", "e", "i", "-", and the alphanumeric character "e" is associated. This means that the available labels are reduced to "Weilheim", "Weitstadt" and "Wetzstadt". The third character possible is therefore now only the letters "i" and "t".

In step 3, the character string "We" has therefore already been input. The handwritten input now made is a vertical stroke. An input character of this kind can, in principle, be interpreted as the digit "1" or one of the letters "I" (in upper case) or "1" (in lower case). However, since the available characters now include only the letters "i" and "t", the alphanumeric character "l" can be explicitly associated. The available labels left are now "Weilheim" and "Weitstadt". The next letter to be input can therefore be only an "1" or a "t", which means that the available characters are reduced to these.

In step 4, the character string "Wei" has therefore already been input. A handwritten input of a vertical stroke is made again. By means of comparison with the available characters "l" and "t", it is now possible to explicitly associate the letter "l". The only label which now remains with the initial character string "Weil" is the label "Weilburg", which has therefore been found explicitly. By dynamically adapting the available characters, ambiguities in the interpretation of an input character have been avoided and the selection process has been speeded up.

FIG. 2 shows a navigation system in which the inventive method can advantageously be used. The central component of the navigation system is the computation unit 1. The computation unit 1 has an operator control unit 2 connected to it which can be used to input a destination, for example. The operator control unit 2 has a rotary/push control 10 into which a touchpad for handwritten input has been integrated.

The computation unit 1 has a visual output unit 3 connected to it which can be used to output a map presentation and routing information and also other information. In addition, the routing information can be output on a loudspeaker 4.

The computation unit 1 is also connected to a database 5 which contains the land map data and the place names for destination selection. These data are stored on a CD-ROM or a DVD, for example. Other known storage means, such as a hard disk or a memory card, may likewise be used.

Using the land map data, and with the starting location and destination provided, the computation unit 1 can calculate the optimum route in known fashion, and this can then be output on the visual output unit 3.

To determine the current vehicle position, the navigation system also contains a receiver 6 for receiving satellite navigation signals. To be able to perform position finding which is independent of satellites, the navigation system also contains a direction sensor 7 and a movement sensor 8, which are likewise connected to the computation unit 1, so that a suitable computer program and the signals from said sensors can be used for position finding.

Furthermore, the computation unit 1 may additionally be connected to a broadcast radio receiver 9 which is designed to receive RDS-TMC signals. It is thus possible for received traffic information to be forwarded from the broadcast radio receiver 9 to the computation unit 1 and to be used for the route calculation. Alternatively, traffic information may also be received and forwarded to the computation unit 1 via a mobile radio, particularly based on the GSM standard.

In contrast to the navigation system shown, the land map data may also be transmitted from a central service office to the vehicle using a mobile radio link. In this case, a reader for a storage medium containing the land map data in the vehicle can be dispensed with. The route calculation can also be performed outside the vehicle. Nevertheless, this case also requires the input of a destination, which means that the inventive method can be used to advantage, the handwritten input of a character being effected using the touchpad of the rotary/push control 10. The method is carried out in the computation unit 1 in the manner described above using an appropriate program.

Instead of an operator control unit 2 and a display unit 3, the navigation system may also have a combined operator control/display unit 20. The operator control and display unit 20 shown in FIG. 3 has different regions, namely a first region 16 which graphically shows operator control elements. In the exemplary embodiment, the first region 16 is split into three subregions 16a to 16c. The region 16b graphically shows function keys, which can be used to activate the various basic functions of a multimedia system with which the navigation system is associated. By contrast, the subregions 16a and 16c graphically show operator control elements on the basis of the selected basic function. A second region 17 of the operator control and display device 20 is in the form of a handwritten input apparatus. This region can be used to make handwritten inputs. By way of example, the user can use a finger 21 or a stylus to input digits of a telephone number or letters for a place name here. In addition, the operator control and display unit 20 has a third region 18, which is used as a pure display region. Furthermore, there is a further display region 19. The display region 19 can be used together with the second region 17 to display a map presentation when a navigation function is selected, for example. The second input region 17 is therefore used doubly.

If the user inputs a character into the second region 17 in handwriting, a character recognition apparatus associates alphanumeric characters with the handwritten input characters as described previously. The character string generated in this way is shown visually in the display panel 19. In the exemplary embodiment, the display panel 19 is split into a first display panel 19b, which is used to show an input place name, and a second input panel 19c, which is used to show an input road name.

What is claimed is:

1. A method for selecting a label from a multiplicity of labels stored in a memory element, comprising:
   inputting a handwritten character into a handwritten input apparatus;
   associating an alphanumeric character with the handwritten input character using a character recognition apparatus;
   adding the associated alphanumeric character to an already input character string to produce an extended character string;
   comparing the extended character string with the labels stored in a memory; and
   selecting one or more of the stored labels using the comparison;
   wherein the step of associating includes selecting the alphanumeric character from a dynamically alterable character set which contains only characters which, in addition to the already input character string, produce an extended character string which is an initial component of at least one of the stored labels,
   whereby a next input is limited to a limited number of inputs based on the stored labels.

2. The method as claimed in claim 1, wherein the dynamically alterable character set is stored in the form of a list.

3. The method as claimed in claim 1, wherein two or more alphanumeric characters are provided for selection if it is not explicitly possible to associate a first one of the alphanumeric characters with the handwritten input character.

4. The method as claimed in claim 1, further comprising creating a list that includes labels which comprise the extended character set as an initial component after said step of comparing.

5. The method as claimed in claim 4, wherein following the input of a further character the step of comparing takes place using the list.

6. The method as claimed in claim 1, further comprising the step of outputting an acknowledgement after said step of associating is completed.

7. A motor vehicle navigation system, comprising:
   a handwritten input apparatus;
   a character recognition apparatus;
   a memory storing a plurality of address database entries; and
   a processor connected to each of said handwritten input apparatus, said character recognition apparatus, and said memory, said processor running an executable program for selecting one of the plurality of address database entries, the program comprising the steps of:
   inputting a handwritten character into said handwritten input apparatus;
   associating an alphanumeric character with the handwritten input character using said character recognition apparatus;
   adding the associated alphanumeric character to an already input character string to produce an extended character string;

comparing the extended character string with the address database entries stored in the memory; and selecting one or more of the stored address database entries using the results of the step of comparing;

wherein the step of associating includes selecting the alphanumeric character from a dynamically alterable character set which contains only characters which, in addition to the already input character string, produce an extended character string which is an initial component of at least one of the stored address database entries, whereby a next input is limited to a limited number of inputs based on the stored labels.

8. The motor vehicle navigation system as claimed in claim 7, wherein the handwritten input apparatus is a touchpad.

9. The motor vehicle navigation system as claimed in claim 8, wherein the touchpad is integrated in a rotary/push control.

10. The motor vehicle navigation system as claimed in claim 7, wherein the handwritten input apparatus is a touchscreen.

* * * * *